US008117294B2

(12) United States Patent
Pollakowski et al.

(10) Patent No.: US 8,117,294 B2
(45) Date of Patent: Feb. 14, 2012

(54) MANAGING OF NETWORK EQUIPMENT

(75) Inventors: Olaf Pollakowski, Berlin (DE); Joerg Schmidt, Chandler, AZ (US); Clemens Suerbaum, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 20 days.

(21) Appl. No.: 12/168,642

(22) Filed: Jul. 7, 2008

(65) Prior Publication Data

US 2010/0005161 A1 Jan. 7, 2010

(51) Int. Cl.
*G06F 15/173* (2006.01)
(52) U.S. Cl. ............... 709/223; 709/231; 707/999.201; 455/419
(58) Field of Classification Search .......... 709/223, 709/231; 455/419; 707/999.201
See application file for complete search history.

(56) References Cited

U.S. PATENT DOCUMENTS

| 2003/0200149 A1 | 10/2003 | Gonzalez et al. | |
| 2004/0123091 A1 | 6/2004 | Das | |
| 2005/0246451 A1* | 11/2005 | Silverman et al. | 709/231 |
| 2006/0031407 A1 | 2/2006 | Dispensa et al. | |
| 2007/0050426 A1* | 3/2007 | Dubal et al. | 707/201 |
| 2007/0093243 A1* | 4/2007 | Kapadekar et al. | 455/419 |
| 2009/0113033 A1* | 4/2009 | Long et al. | 709/223 |
| 2010/0005161 A1* | 1/2010 | Pollakowski et al. | 709/223 |

FOREIGN PATENT DOCUMENTS

WO 98/34350 8/1998

OTHER PUBLICATIONS

3rd Generation Partnership Project; Technical Specification Group Services and System Aspects' Telecommunication management; Principles and high-level requirements; 3GPP TS 32.101 V8.2.0; 2008; pp. 1-56.

* cited by examiner

*Primary Examiner* — Kyung H Shin
(74) *Attorney, Agent, or Firm* — Staas & Halsey LLP

(57) ABSTRACT

An exemplary embodiment of a management apparatus can be provided. For example, the exemplary managing may include a profile device/arrangement and a process device/arrangement. The profile device/arrangement can include at least one process profile. Furthermore, the process device/arrangement can generate, by using the at least one process profile, a process description. For example, the generated process description may be a description of a physical process. Further, the generated process description may be executed in order to control the physical process in accordance with the generated process description. In addition, method, program arrangement and computer-accessible medium can be provided to perform certain procedures to generate the above-described process description.

17 Claims, 13 Drawing Sheets

Supporting object class swManagementCapabilities (read only)
This object class allows the IRPManager to determine on the Itf-N interface in which sequence the sw management steps are performed in NEs of a certain type, what is done by the NE in case a step does not perform normally and before which steps a stop point can be set, such that the self-configuration step halts and waits for a continuation request by the IRPManager.
    Attributes:
        id
        nEAndSWInformation: to describe for which NE or NEs and which SW version this
            swManagementCapabilities applies (examples: identifier+objectClass, identifierList+objectClass, object class, NEtype, vendor version etc.). It may also describe dependencies to the presence of other SW packets.
        swStepList (Read only)
            Each entry in the list contains (SET OF):
- nameOfPotentialStopPointSwStep Values:
      swDownload
      swFallback
      swInstallation
      swActivation
  This list shall be exhaustive; if a certain step is not visible or not supported in the SW management process, then it shall not be shown (listed) in the swStepList.
- sequenceNumberInScProcess
- behaviourInCaseOfErrorsOrDelays (values: stepSkippedAndSwManagementContinued/SwManagementProcessStopped)
- stopPointProperty (values: stopPointCanBeSetBeforeThisStep/ stopPointCanNotBeSet)

Fig 6

Supporting object class SwManagementProfile
This object class allows the IRPManager to select from the stop points offered in nameOfPotentialStopPointSwStep of s2ManagementCapabilities those which should be used to stop the SW management process for NEs which fit to the nEAndSWInformation. For an NE starting its self-configuration process there should be no ambiguity which profile is valid for the NE.
  Attributes:
    id
    nEAndSWInformation:
        nEAndSWInformation of the swManagementProfile must not intersect with nEAndSWInformation of other swManagementProfile instances.
    swActivatedStopPointList: List of steps before which an SW management process following this profile stops, values: same as of nameOfPotentialStopPointSwStep
        A check if this swActivatedStopPointList is valid is needed: All stop points steps selected in swActivatedStopPointList need the property stopPointCanBeSetBeforeThisStep in a swManagementCapabilities instance where the nEAndSWInformation covers the nEAndSWInformation of the swManagementProfile.

Fig 7

Supporting object class swManagementProcess (
This object class describes the SW management process for a self-configuring NE. It allows the IRPManager to be informed about the current status of the process, which steps are completed etc.
  Attributes:
    id
    nEIdentification : Uniquely identifies the NE where the SW management process is running.
    swStepList
        Each entry in the list contains:
            ▪ nameOfSwStep
              Values: see nameOfPotentialStopPointSwStep
            ▪ stepStatus (values: notYetDone/running/completed/awaitingConfirmation/failure)
            ▪ stopPointSetStatus (values: stopPointIsSetBeforeThisStep/ stopPointIsNotSet)

Fig 8

Operation listSwmCapabilities (M)
This operation allows the IRPManager to determine on the Itf-N interface which steps in the SW management are performed in NEs of a certain type, what is done by the NE in case a step does not perform normally and before which steps a stop point can be set, such that the software download halts and waits for a continuation request by the IRPManager.
- Input parameters:
    - nEAndSWInformation (O): to describe for which NE or NEs the capabilites are to be listed (examples: identifier+objectClass, identifierList+objectClass, object class, NEtype, vendor version etc.). If this parameter is not present, all SwmCapabilities instances are to be listed in the output.
- Output parameters:
    - SwmCapabilitiesList (M)
        - Each entry in the list contains (SET OF):
            - Id of SwmCapabilities
            - nEInformation of SwmCapabilities
            - swmStepList of SwmCapabilities

- result (M) result=success and empty SwmCapabilitiesList mean: No instance found.

Fig 9

Operation listSwmProfiles (M)
This operation allows the IRPManager to find out which instances of SwmProfile are valid NEs of a certain type.
- Input parameters:
    - nEAndSWInformation (M): to describe for which NE or NEs the profiles are to be listed (examples: identifier+objectClass, identifierList+objectClass, object class, NEtype, vendor version etc.). If this parameter is not present, all SwmProfiles instances are to be listed in the output.
- Output parameters (M):
    - SwmProfileList (Read only)
        - Each entry in the list contains (SET OF):
            - Id of SwmProfile
            - nEInformation of SwmProfile
            - swmActivatedStopPointList of SwmProfile

- result (M) result=success and empty SwmProfile mean: No instance found.

Fig 10

Operation `createSwmProfiles` (M)
This operation allows the IRPManager to establish an instance of `SwmProfile` to be valid for NEs of a certain type.
    Input parameters:
        `Id` (O)
        `nEandSWInformation`: to describe for which NE or NEs this profile applies (examples:
            identifier+objectClass, identifierList+objectClass, object class, NEtype, vendor version etc.)
            `nEInformation` of the `swManagementProfile` must not intersect with `nEInformation` of
        other `swmManagementProfile` instances.
        `swmActivatedStopPointList`: List of steps before which the SW management process stops,
            values see `nameOfPotentialStopPointSwmStep` above.

A check if this `swmActivatedStopPointList` is valid is needed: All stop points steps selected
        in `swmActivatedStopPointList` need the property `stopPointCanBeSetBeforeThisStep`
        in a `swManagementCapabilities` instance where the `nEInformation` covers the
        `nEInformation` of the `swManagementProfile`.
    Output parameters:
        `Id` (M)

result (M)

Fig. 11

Operation `changeSwmProfiles` (O)
This operation allows the IRPManager to change an instance of `SwmProfile`.
    Input parameters:
        `Id` (M)
        `nEandSWInformation`: see Fig. 11
        `swmActivatedStopPointList`: see Fig. 11
    Output parameters:

result (M)

Fig. 12

Operation deleteSwmProfiles (M)
This operation allows the IRPManager to delete an instance of swManagementProfile.
  Input parameters:
    Id (M)
  Output parameters:
  result(M)

Fig 13

Operation listSwmProcesses (M)
This operation allows the IRPManager to find out which NEs are currently running a SW management process and its status.
  Input parameters:
    nEAndSWInformation (O): to describe for which NE or NEs the swmProcesses are to be listed (examples: identifier+objectClass, identifierList+objectClass, object class, NEtype, vendor version etc.). If this parameter is not present, all swManagementCapabilities instances are to be listed in the output.
  Output parameters:
    swmProcessList (M)
      Each entry in the list contains (SET OF):
        - Id of swmProcess
        - nEIdentification : Uniquely identifies the NE where the SW management process is running.
        - swmStepList
          Each entry in the list contains:
            - nameOfSwmStep see definition of swmProcess
            - stepStatus see definition of swmProcess
            - stopPointSetStatus see definition of swmProcess
    result (M) result=success and empty swmProcessList mean: No instance found.

Fig 14

Operation continueSwmProcess (M)
This operation allows the IRPManager to contine a SW management process which currently has stopped at a stop point step.
  Input parameters:
    id(M): of swmProcess
  Output parameters:
    result(M)

Fig 15

Operation `cancelSwmProcess` (O)
This operation allows the IRPManager to cancel a SW management process which is currently ongoing.
   Input parameters:
      `id(M)`: of `swmProcess`
   Output parameters:
      `result (M)`

<p align="center">Fig. 16</p>

`Notification notifyNewSwAvailability (O)`
This notification conveys information about the availability of new SW.
        Input parameters:
      `NEandSWversion (M)` : to inform about new available SW, SW version and NE / NE version (types) for which it is valid <p align="center">Fig. 17</p>

`Notification notifySwmProfileCreation (M)`
This notification conveys information about the creation of an instance of IOC swManagementProfile.
   Input parameters:
      `Id (M)`
      `nEInformation (M)`: See Fig. 10
      `swmActivatedStopPointList (M)`: See Fig. 10

<p align="center">Fig. 18</p>

`Notification notifySwmProfileChange (C/O)`
This notification conveys information about a change of an instance of IOC swManagementProfile.
   Input parameters:
      `Id (M)`
      `nEInformation (M)`: See Fig. 10
      `swmActivatedStopPointList (M)`: See Fig. 10

<p align="center">Fig. 19</p>

Notification notifySwmProfileDeletion (M)
This notification conveys information about the deletion of an instance of IOC swManagementProfile.
Input parameters:
    Id (M)

<p align="center">Fig. 20</p>

Notification notifySwmProcessCreation (M)
This notification conveys information about the creation of an instance of IOC swmProcess.
    Id (M) of swmProcess
        nEIdentification (M):    See Fig. 8
        swmStepList (M):    See Fig. 8

<p align="center">Fig. 21</p>

Notification notifySwmProcessStatusChange (M)
This notification conveys information about the change of an instance of IOC swmProcess.
    Id (M) of swmProcess
        nEIdentification (M):    See Fig. 8
        swmStepList (M):    See Fig. 8

<p align="center">Fig. 22</p>

Notification notifySwmProcessCancelled (C/O)
This notification conveys information about the deletion of an instance of IOC swmProcess
    Id (M) of swmProcess <p align="center">Fig. 23</p>

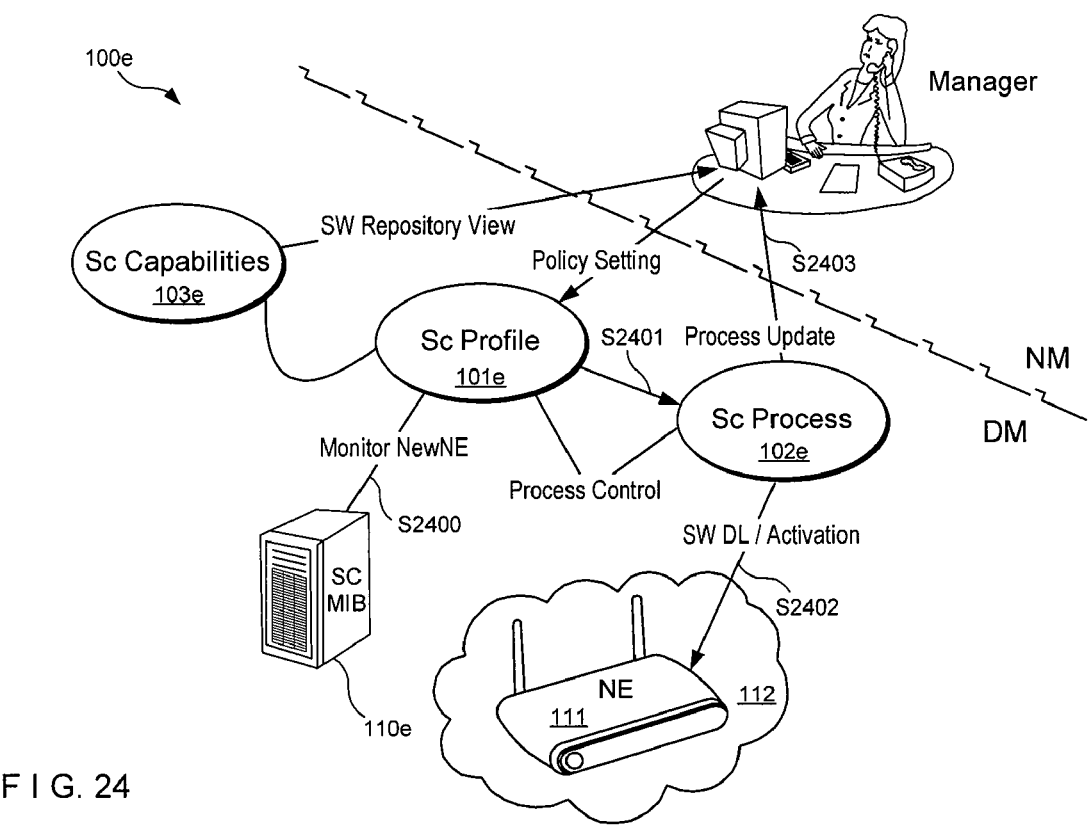
F I G. 24

MANAGING OF NETWORK EQUIPMENT

FIELD OF THE PRESENT INVENTION

The present invention relates to the field of communication networks, in particular to a management apparatus, a method for managing a network equipment and a program element for managing a network equipment.

BACKGROUND INFORMATION

Initiatives, such as 3GPP (3rd Generation Partnership Project), indicate that it may be a strong preference to connect different types of networks and provide end to end services in networks comprising different network element types. Furthermore, many operators may have multi vendor networks, wherein different network elements provided by different vendors may be operated differently.

This may make multi-vendor OAM complex and costly (integration efforts etc.). Because network operators may need to manage multi-vendor networks, they may require standardized interfaces and management procedures for all network elements of different vendors.

Management procedures of network elements (and intervention possibilities within these procedures) are highly element-specific, vendor-specific and even network operator-specific.

From the technical specification 3GPP TS 32.101, "Principles and high level requirement", V8.2.0, (2008-06), from the 3rd generation partnership project, technical specification group services and system aspects, Telecommunication management, management principles and high-level requirements for the management of Public Land Mobile Networks are known. There may be a need to provide a more effective network management.

SUMMARY OF EXEMPLARY EMBODIMENTS OF THE PRESENT INVENTION

According to exemplary embodiments of the present invention, a management apparatus, a method for managing network equipment and a program element/arrangement may be provided.

According to an exemplary embodiment of the present invention a management, the management apparatus may be facilitated comprising a profile device/arrangement, and a process device/arrangement may be provided. The profile device/arrangement may be adapted to comprise at least one process profile. The process device/arrangement may be adapted to generate a process description by using the at least one process profile. The generated process description may be a description of a physical process. The generated process description may be executed in order to control the physical process in accordance with the generated process description.

According to another exemplary embodiment of the present invention, a method for managing a network equipment is provided. The method may comprise generating a process description by using at least one process profile, wherein the generated process description may be a description of a physical process. According to a particular exemplary embodiment of the present invention the method may comprise an execution of the generated process description and a control of a physical process in accordance with the generated process description.

According to another exemplary embodiment of the present invention, a program element/arrangement for managing a network equipment may be provided, whereas, when program element/arrangement is executed by a processor, the processor may be adapted to carry out the exemplary embodiment of the method as set forth herein.

According to yet another exemplary embodiment of the present invention, a computer-readable medium may be provided in which a computer program for managing a network equipment may be stored, wherein the computer program is executed by a processor, the processor may be adapted to carry out the exemplary embodiment of the method as set forth herein.

A computer-readable medium may be, e.g., a floppy disk, a hard disk, an USB (Universal Serial Bus) storage device, a RAM (Read Access Memory), a ROM (read only memory) and an EPROM (Erasable Programmable Read Only Memory). A computer readable medium may also be a data communication network, e.g. the Internet, which can facilitate the downloading of a program code.

Thus, an exemplary embodiment of a method for modeling and managing automatic management processes may be provided. In particular, the exemplary embodiment of the method for modeling and managing automatic multi vendor software management processes may be provided.

The exemplary management apparatus may be used for processes which are executed automatically or substantially automatically as for example a self-configuration process of a newly installed network equipment, network element or NE. Processes which are automatically executed may be used in Self-Organizing Networks (SON).

One exemplary benefit of the exemplary embodiment of automated software management according to the present invention may be to reduce manual action for a user of the management apparatus when bringing many network elements into the network or to prevent or to reduce manual interaction during software updates in an up and running network element.

According to an exemplary embodiment of the present invention, a network automatic provision may be possible if an operator or an IRP (Integration Reference Point) Manager can determine the grade of automation.

In another exemplary embodiment of the present invention, process objects may be automatically generated upon predefined events, e.g. new software is made available or a new network element is made available. After generating the new process object the physical process or the real world-process may be started. After completing the physical process, the exemplary process object representing the physical process may be deleted. According to still another exemplary embodiment, the process may manually be generated and/or deleted by the operator.

According to a further exemplary embodiment of the present invention, the management apparatus may further comprise a capability device/arrangement. The capability device may be adapted to comprise at least one capability, whereas the profile device can be connected to the capability device.

The profile device device/arrangement may be further configured to select one of the at least one capabilities for generating the at least one process profile. In a particular, according to one exemplary embodiment, the manager or operator may generate the profile by profiling the Capabilities.

A capability may be a description of services which may be provided by a system, in particular by a network communication system comprising a plurality of network elements. Furthermore, a capability may be a capability of one specific network element of the plurality of network elements forming the communication network or the communicating system. An example for a capability can be a software version, a stop point, a compatibility information etc. In addition, the management apparatus/system may play a role in providing the capabilities. The management system may comprise a domain manager and/or an element manager.

The capability may be provided by a software repository. The capability, and in particular, information about a capability of a network element may be used in order to generate profiles. The profiles may be policies or rules. Thus, such a profile may comprise rules for making decisions. For example rules making decision on a software version which may have to be installed.

For example, as soon as a new software is detected in a software repository, a new instance of a capability in the capability device/arrangement may be generated. The capability device/arrangement may be an object or a process running on a processor. In a particular exemplary embodiment, if new software may be detected, the capabilities object may be updated.

In a further exemplary embodiment of the present invention, the profile device may be a profile object, the process device may be a process object, and the capability device may be a capability object.

Furthermore, an example for capability may be the capability to set stop points in a process at predefined steps. For example, a capability instance of a software corresponding to a software in the software repository may supply the profile device, a user terminal, a manager or an IRP Manager with possible locations, steps, stages or positions where this particular software may be interrupted.

These possible interruption stages may be selected within a profile to control the execution of a process. In other words, a physical process may be interrupted at the stages which are represented by the capabilities relating to associated software. Thus, the software capabilities may be seen as the elements which can be used to compose a profile or to use within a profile and base a profile on it.

According to another exemplary embodiment of the present invention, the process profile may be generated by profiling the at least one capability.

For example, a profile object may be instantiated by profiling at least one capability object. Unless an object may not be initiated the object may not exist.

According to another exemplary embodiment of the present invention, at least one capability may be a stop point capability, a specific network element capability, a software version capability, a software package available capability, and/or a capability offered by a system.

According to yet another exemplary embodiment of the present invention, the stop point capability can be configured to control interrupting of the executed process description and/or to control the physical process.

An exemplary process may execute automatically, e.g., without substantially involving the interaction of a user. However, in some cases, a fully automatic execution of a process may not be desired. For example, configuring a very important network node, e.g. a network node which may carry a plurality of connections or which may carry important connections should provide interaction with a user or a manager. Such interruption may allow for controlled provisioning. A stop point capability which may be adapted to control interrupting a process may facilitate predetermining the grade of involvement of a user when executing an automatic process.

According to yet another exemplary embodiment of the present invention, the capability device may be connected to a software repository.

The exemplary connection with a software repository may facilitate the capability device to detect the presence of new software and thus, may allow detecting the existence of new capabilities like for example a new software version.

According to a further exemplary embodiment of the present invention, the profile device may be connected to a network repository.

Thus, the exemplary profile device may be enabled to detect when a new network element may be brought into a communication network or into a communication network system which is controlled by the inventive management apparatus.

According to another exemplary embodiment of the present invention, the process device may be connected to a network element by a connection or by a link. The physical process may be configured to influence the network element via the connection in accordance with the exemplary process.

The exemplary physical process, which may be represented by a process object or by the process device/arrangement, can be used to influence the network element. For example, the exemplary physical process may install new software on the network element, and/or can commission or configure a corresponding network element.

For example, if an end-to-end service may have to be provided, a plurality of network equipments may have to be configured. An end-to-end connection may comprise a plurality of network elements. For example, the end-to-end connection may comprise a CPE (Customer Premise Equipment), which may be configured by using simple configuration procedures such as FTP (File Transfer Protocol). Furthermore, in an end-to-end connection also sophisticated network elements may be included, which may have to be carefully configured. If such a sophisticated network element or an important network element fails, a great impact may be caused to a network.

Therefore, less automation may be desired when providing such an important network element. The exemplary process device/arrangement may be an instance, which substantially may only exist during the process is active. For example, a self-configuration process may only exist until a corresponding network element is configured. As another example, a software management process may only exist as long as a corresponding software may be installed on the corresponding network element.

Software management may include all OAM work which may have to be conducted in relation with installing software on a network element. Self-configuring may comprise all steps, which may have to be conducted during an automatically configuring of a network element.

According to another exemplary embodiment of the present invention the process may be at least one process selected from the group consisting of a self-configuring process, a self-provisioning process, a self-optimizing process, a self-healing process and a software-management process.

As an example, the process may be a physical process, a description of the corresponding process, a representation of a physical process, a projection of a physical process to process description or an instance of the exemplary process.

According to another exemplary embodiment of the present invention, the profile device/arrangement, the process device/arrangement and/or the capability device/arrangement can be an object. Such object may be executed by a processor or on a processor.

In a particular exemplary embodiment of the present invention, the profile device/arrangement, the process device/arrangement and/or the capability device/arrangement may comprise a corresponding object. In another exemplary embodiment, the profile device/arrangement, the process device/arrangement and/or the capability device/arrangement can be a profile object, a process object and/or a capability object, respectively.

In another exemplary embodiment, the profile device/arrangement, the process device/arrangement and/or the capability device/arrangement may be a hard wired device.

For example, hard-wiring may prevent extending the functionality of a device in the case of new developments. For example, a new software version may substantially not be added in a hard wired device.

Realizing the exemplary device/arrangement/apparatus according to an example as an object based on object based programming may allow to generate and to delete such an object as desired. For example, for every software version available for a corresponding network element, an instance of a capability object may be generated.

In another exemplary embodiment, for a stop point within a network an instance of a capability object may be generated. In yet another exemplary embodiment one capability object may allow to carry or provide different capability types, e.g. software version and stop points.

Profiles thus, may allow to flexibly being configured by an operator or by a manager of the network. Thus, if a new profile may have to be generated, a new instance for the corresponding profile may be generated. Implementing the process device as an object or as comprising an object may also allow to generate, in particular the process description, substantially only for the time the corresponding process may be active. Generating instances, thus, may facilitate an increase of the flexibility and to reduce storage capacity.

According to yet another exemplary embodiment of the present invention, the profile device/arrangement, the process device/arrangement and/or the capability device/arrangement may comprise a management interface. The management interface may be adapted to communicate with a management instance.

A management instance, for example, may be a user, manager, an IRP manager and/or a network manager which may be provided on or in, lie or lay on a higher logical layer than the corresponding device/arrangement.

For example, the capability device/arrangement, the profile device/arrangement and/or the process device/arrangement may provided on or in, or lie on a domain manager layer, whereas the management instance may be provided on or in or lie on a network manager layer.

According to yet another exemplary embodiment of the present invention, the profile device/arrangement, the process device/arrangement and the capability device/arrangement may be provided on or in or lie on a domain manager layer.

According to another exemplary embodiment of the present invention, the management apparatus may be a distributed system.

Thus, e.g., the profile device/arrangement, the process device and/or the capability device may be executed by different physical hardware. Furthermore, the profile device/arrangement, the process device/arrangement and/or the capability device/arrangement may comprise corresponding objects, which objects are instances on different processors. Or in another exemplary embodiment of the present invention the objects are generated in separate areas of a memory or processor.

According to yet another exemplary embodiment of the present invention, the method for managing a network equipment may further comprise selecting at least one capability comprised in a capability device/arrangement. Furthermore, the exemplary method may comprise generating the at least one process profile by using the at least one selected capability.

Thus, the exemplary management apparatus or the automated multi-vendor software management system may offer a logical model for automated processes.

Furthermore, exemplary multi-vendor management capabilities for processes may be provided.

In another exemplary embodiment of the present invention, the capability to set policies for the process execution may be provided.

The exemplary management apparatus may offer the capability to configure the desired manager interaction capabilities covering the range from a fully automatic and autonomous process to a more or less tightly manager controlled process. An autonomous process may substantially not need manager interaction.

The exemplary model, e.g., comprising three different objects and the interaction capabilities defined for the communication within a management apparatus, may be generic and can be applicable to other types of automated multi-vendor processes.

Further, exemplary embodiments of the present invention and certain aspects of the exemplary invention have been described with reference to different subject-matters. In particular, some exemplary embodiments have been described with reference to apparatus type claims, whereas other embodiments have been described with reference to method type claims. However, a person skilled in the art will gather from the above and the following description that unless other notified in addition to any combination between features belonging to one type of subject-matter also any combination between features relating to different subject-matters in particular between features of the apparatus claims and the features of the method claims may be considered to be disclosed with this application.

These and other aspects of the present invention will become apparent from and elucidated with reference to the exemplary embodiments described hereinafter.

Exemplary embodiments of the present invention will be described in the following with reference to the following drawings.

BRIEF DESCRIPTION OF THE DRAWINGS

Further objects, features and advantages of the present invention will become apparent from the following detailed description taken in conjunction with the accompanying figures showing illustrative exemplary embodiments of the present invention, in which:

FIG. 6 is a supporting object class swManagementCapabilities according to an exemplary embodiment of the present invention;

FIG. 7 is a supporting object class SwManagementProfile according to an exemplary embodiment of the present invention;

FIG. 8 is a supporting object class swManagementProcess according to an exemplary embodiment of the present invention;

FIG. 9 is an operation listSwmCapabilities according to an exemplary embodiment of the present invention;

FIG. 10 is an operation listSwmProfiles according to an exemplary embodiment of the present invention;

FIG. 11 is an operation createSwmProfiles according to an exemplary embodiment of the present invention;

FIG. 12 is an operation changeSwmProfiles according to an exemplary embodiment of the present invention;

FIG. 13 is an operation deleteSwmProfiles according to an exemplary embodiment of the present invention;

FIG. 14 is an operation listSwmProcesses according to an exemplary embodiment of the present invention;

FIG. 15 is an operation continueSwmProcess according to an exemplary embodiment of the present invention;

FIG. 16 is an operation cancelSwmProcess according to an exemplary embodiment of the present invention;

FIG. 17 is a notification notifyNewSwAvailability according to an exemplary embodiment of the present invention;

FIG. 18 is a notification notifySwmProfileCreation according to an exemplary embodiment of the present invention;

FIG. 19 is a notification notifySwmProfileChange according to an exemplary embodiment of the present invention;

FIG. 20 is a notification notifySwmProfileDeletion according to an exemplary embodiment of the present invention;

FIG. 21 is a notification notifySwmProcessCreation according to an exemplary embodiment of the present invention;

FIG. 22 is a notification notifySwmProcessStatusChange according to an exemplary embodiment of the present invention;

FIG. 23 is a notification notifySwmProcessCancelled according to an exemplary embodiment of the present invention; and FIG. 24 is a combination block/flow diagram for providing a new NE in a network management system architecture for self-configuration and method according to still another exemplary embodiment of the present invention.

Figure 1:
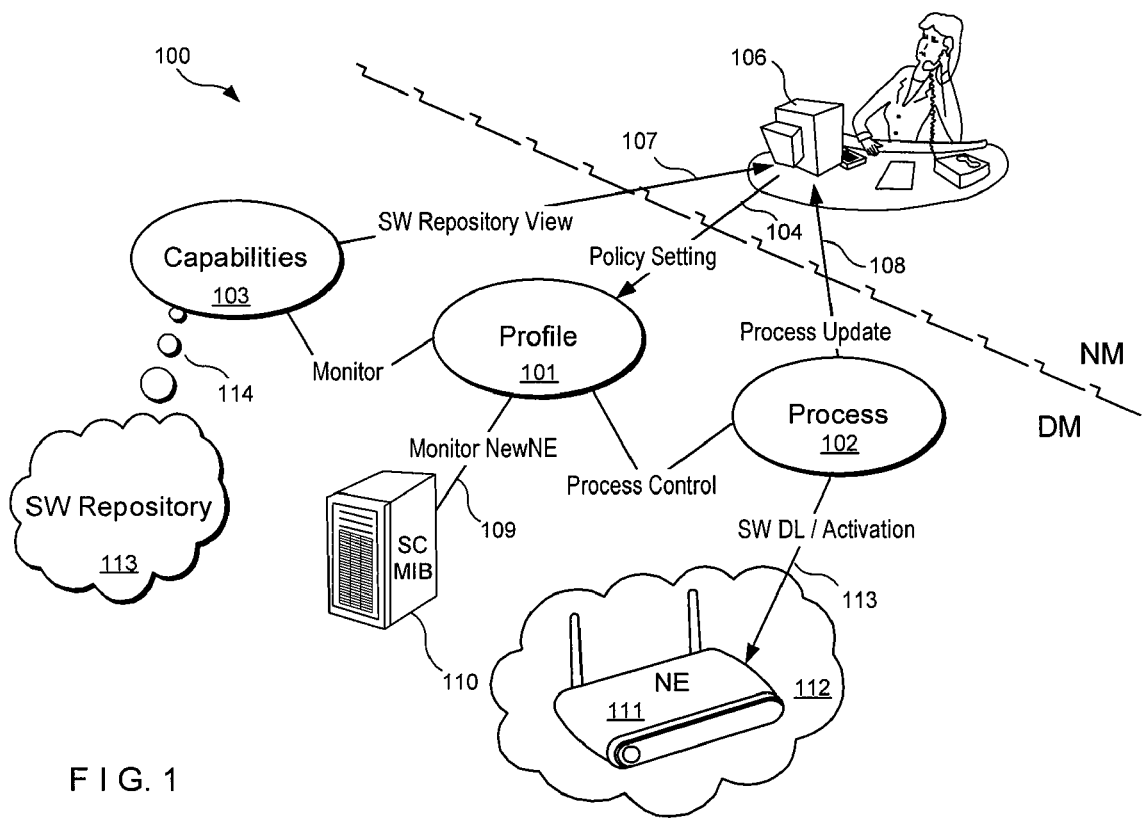
FIG. 1 is a general combination block/flow diagram of a network management system architecture and method according to an exemplary embodiment of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

FIG. 1 shows a general combination block/flow diagram of a network management system architecture for software management and a method therefor according to an exemplary embodiment of the present invention. Using the exemplary network management system 100 as shown in FIG. 1, an apparatus automated software management is facilitated.

For example, FIG. 1 shows the management apparatus 100 or network management apparatus 100, the network management apparatus 100 comprising the profile device/arrangement 101, the process device/arrangement 102 and the capability device/arrangement 103. The profile device 101, the process device 102 and the capability device 103 are provided on or in or lie on or in a Domain Manager (DM) layer. In particular, according to the exemplary embodiment, the profile device 101, the process device 102 and the capability device 103 are logically positioned, e.g., with respect to one another.

According to one exemplary embodiment of the present invention, the profile device 101, the process device 102 and the capability device 103 may be hardwired devices or may be processors comprising objects. An object may be, e.g., a software object, which may be an instance or a process executed by the processor. The three devices may be separate devices which are linked together, separate objects running on the same processor or separate objects running on separate processors.

The profile device 101 may have a user interface 104, which can be connected to the user terminal 106. The user terminal 106 allows a user, a manager, an IRP Manager or an Operator to control and to operate the network management apparatus 100. The manager may be a process. The user terminal 106 may allow setting a policy via the profile user interface 104. The user terminal 106 may be provided on or in or lies on or in the Network Manager (NM) layer.

The user interfaces 104, 107, 108 may be based on the 1 tf-N network management interface standard. The N interface may connect a network management system either to elements managers or directly to network elements.

In other words, an automated multi-vendor software management may be achieved. The network management 100 may base on a logical model. This exemplary model may comprise three objects 103, 101, 102 or the three devices 101, 102, 103 and related interaction capabilities.

Furthermore, the profile device 101 can have a monitor interface 109, which facilitates the profile device 101 to connect to a hardware repository 110, a self configuration SC process or a management information base MIB. The hardware repository may comprise information about each single network equipment (NE) 111, network element NE, 111 or network node NE, 111. The network equipment NE, 111 may be included in a telecommunication network 112. Examples for telecommunication networks are UMTS (Universal Mobile Telecommunications System), GSM (Global System for Mobile Communications), an IP (Internet Protocol) network and a WiMax (Worldwide Interoperability for Microwave Access) network.

The process device 102 is can be configured to generate processes. In particular, the process device 102 can comprise generated processes as long as the processes exist. As soon as the process device 102 has generated a process, the process device may comprise at least one process, and, e.g., the process device 102 can comprise a description of a physical process or a representation of a physical process. Thus, the process device 102 may comprise a plurality of processes, process objects or instances of processes if a plurality of automated processes are handled in parallel.

The process device 112 may have the user interface 108, which may be based on the 1 tf-N interface standard or N-interface standard. The user terminal 106 receives process update via the interface 108, and can transmit information to the process device 102 via such interface 108. The interface 108 may be a bidirectional interface.

Furthermore, the process device 102 can comprise an NE interface 115. The NE interface 115 may facilitate every physical process and/or every executed process description to access the NE 111 in order to influence the NE. For example, influencing may mean, but not limited to, installing software on the NE 111 or configuring the NE 111.

In another exemplary embodiment of the present invention, the NE interface 115 may facilitate the process device 102 to download a process or process description on the NE 111, in order to execute the process on the corresponding NE. Thus, an interaction may exist between the process device 102 and the corresponding NE 111. The NE interface 115 may be a bidirectional interface and allows communicating between the process device 102 and the NE 111.

The software (sw) repository 113 may be connected to the capability/capabilities device 103 via the sw interface 114 or the repository interface 114. The software interface 114 can be a bidirectional interface and facilitates the capability device 103 to monitor the sw repository 113 for a new software. In other words, substantially as soon as a new software version of a corresponding NE 111 is available in the sw repository 113, the capability device 103 can be informed. For example, employing a push technology may facilitate the sw repository 113 to inform the capability device 113. In another example, the capability device 103 may use a pull technology to request the sw repository 113 for new available software. Any capability which exists is represented as an object within the capability device 103.

The sw repository may be a database/database server 113. In such a case, the sw interface 114 can be a corresponding database interface 114.

As a general concept of the exemplary embodiment of the present invention, the information about the elements 111 and the status of the communication network 112 can be received. Such information can be made available in the sw repository 113 and/or as a result of self-configuration (SC) process 110, in a management information base (MIB) 110, the hardware repository 110 and/or the hw repository 110.

The different repositories 113, 110 facilitate the determination of the capabilities, which may be available at the plurality of NEs 111 installed in the communication network 112. These exemplary capabilities can be made available in the capability device 103 as objects.

The capabilities may be objects provided by the capability device 103. A user terminal 106, a manager 106 or a user at the user terminal may use the capabilities in order to generate profiles in the profile device 101 by setting policies. Each profile in the profile device 101 may be an instance of a profile object.

The capability device 103 and the profile device 101 may facilitate the monitoring of the sw repository 113 and/or the hw repository 110. Thus, the capability device 103 and/or the profile device 101 can determine amendments in the communication network 112, which communication network 112 has to be managed.

The determined amendment may be the availability of a new software version for a certain NE type or the addition or replacement of a NE 111. Such determined amendment can trigger the profile device 101 to find a profile associated with the corresponding amendment and to generate a corresponding process, process instance, process object or process description in the process device 102. Thus, the profile device 101 and the process device 102 facilitate the process control, e.g., software management or self configuration.

Figure 2:
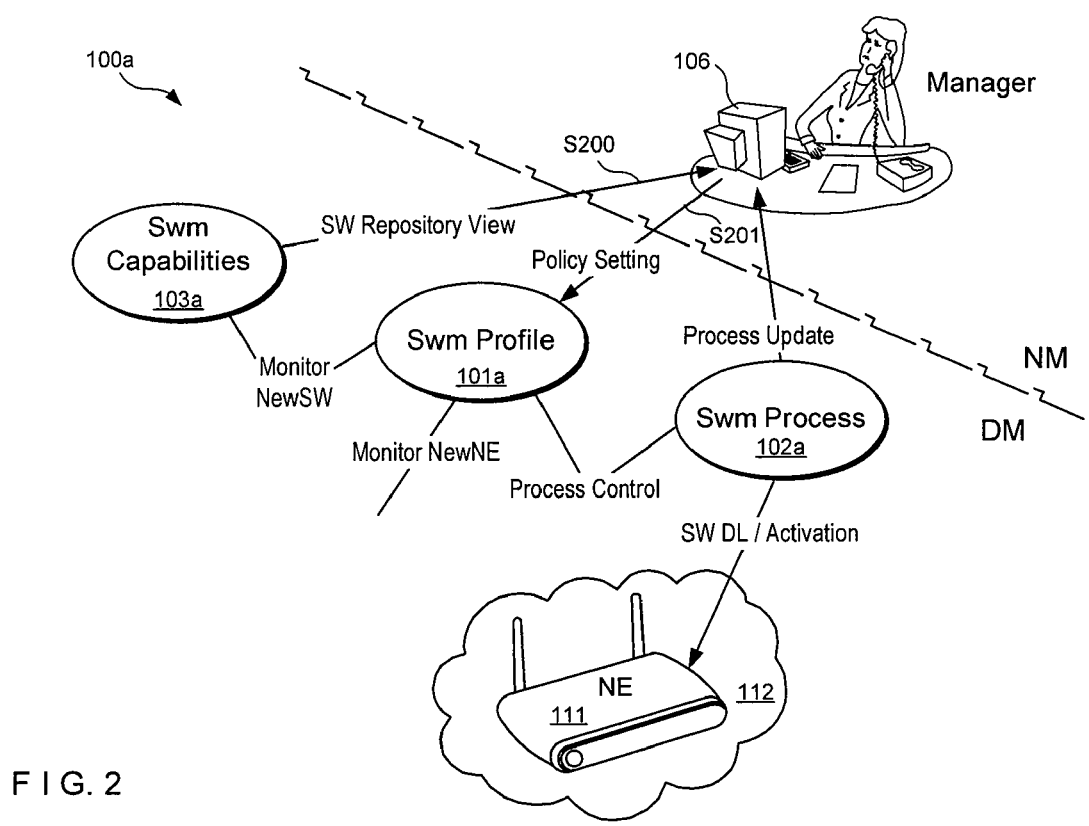
FIG. 2 is a combination block/flow diagram for setting a policy in the network management system architecture and method according to another exemplary embodiment of the present invention.

If the management apparatus 100 is used for software management as shown in FIG. 2, the capability device 103, 103a may comprise software management capabilities (swm) or swm capabilities, the profile device 101, 101a may comprise swm profiles and the process device 102, 102a may comprise swm processes.

A diagram of an exemplary embodiment of the management apparatus 100a for software management and method therefor is shown in FIG. 2. For example, the management apparatus 100a comprises the swm capability device 103a, the swm profile device 101a and the swm process device 102a. The swm capability device 103a comprises the swm capabilities of the network 112 and/or of every NE 111, the swm profile device 101a comprises profiles generated for the software management and the swm process device 102a comprises the generated software management processes.

Software management may mean, but not limited to, automated software management, e.g., automatically managing software. Managing of software may comprise updating software installed on a NE 111 or installing new software on a NE 111.

In FIG. 2 the setting of policies or profiles for automated software management is shown. In step S200 a user terminal 106 or a manger retrieves information that software is available. This information may be provided, when the software, in particular when a new software version is available in the software repository and new capabilities corresponding to the software were generated.

In step S201 the user terminal 106 sets a profile for automated software management. This software management or software management process either is generic for a NE or software based. In a generic software management a relative rule may be used, as for example always installing the newest available software version. In a software-based software management, an absolute decision can be made, for example, always installing the newest software version. In other words, exemplary rules may determine which events, e.g., an availability of new software, trigger which actions, e.g. installing the software. Examples for such rules may be "always installing the newest available software for NE types A" or "always install the last stable software version for NE types B". This may facilitate for an automated NE type dependent software management.

Furthermore, the policy setting may facilitate the setting or defining of the grade of automation. For example a profile may allow for a certain NE 111 a completely automated software management, whereas for another type of NE 111 a controlled software management may be required. Furthermore, the automation may depend on the time, i.e. during office hour feedback from a network operator may be required in a provisioning process, whereas installation out of office hour may be fully automated.

The grade of automation of the software management may be determined by setting stop points within the corresponding profiles.

Figure 3:
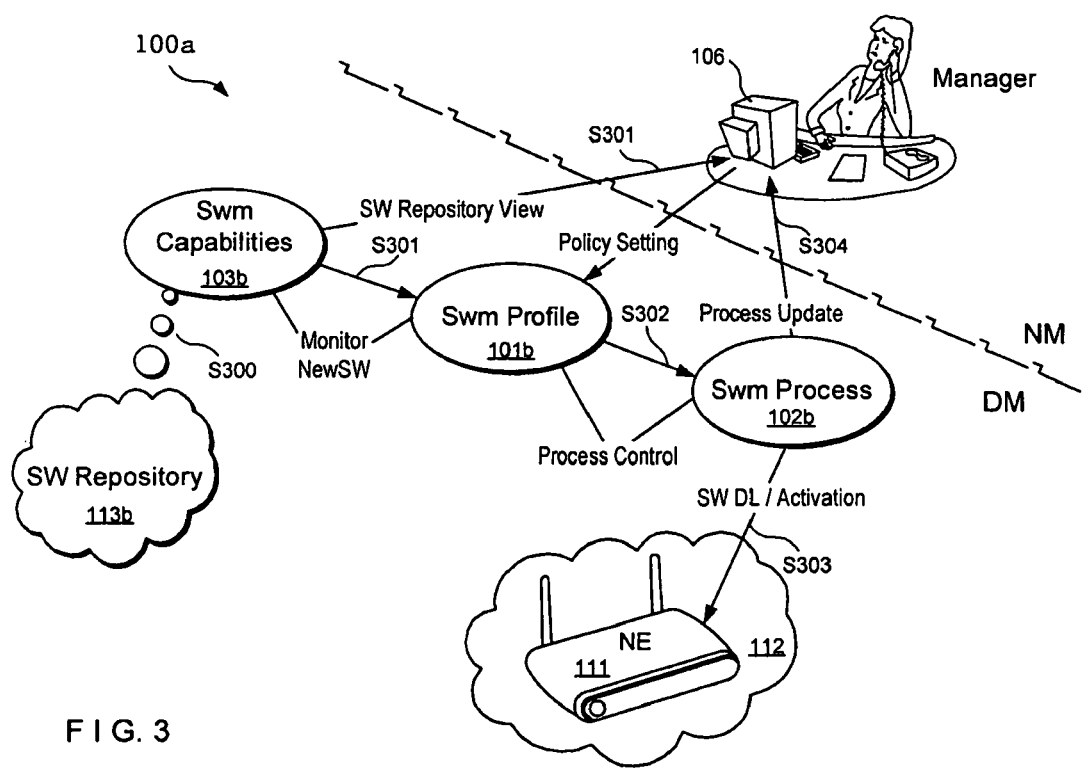
FIG. 3 is a combination block/flow diagram for providing new software in the network management system architecture for software management and method according to still another exemplary embodiment of the present invention.

Another exemplary use case or scenario in the software management process can be the provisioning of a new software or the provisioning of a new software version as shown in the flow diagram of FIG. 3 in a software management environment.

The exemplary method for providing new software may start when new software is made available in the sw repository 113b. For example, in step S300, the swm capabilities device 103b can be informed about the new software and about the corresponding NE 111. In step S301, the swm capability device 103b informs the user terminal 106 and/or the swm profile device 101a. In step S302, the swm profile device 101*a* instantiates or generates a swm process object, a swm process or a swm process description and an associated physical swm process in the swm process device 102*b*.

In step S303 the generated process instance and the generated physical process conduct the process steps as determined by the corresponding profile. For example the physical process performs downloading of the associated software to the corresponding NE 111, installing the associated software on the corresponding NE 111 and activating the associated software on the corresponding NE 111. The results and attributes of the physical process can be mapped to the process description or to the corresponding process object, and thus, in step S304, the process object and/or the physical process may inform the user terminal 106 about the results of the process execution.

Figure 4:
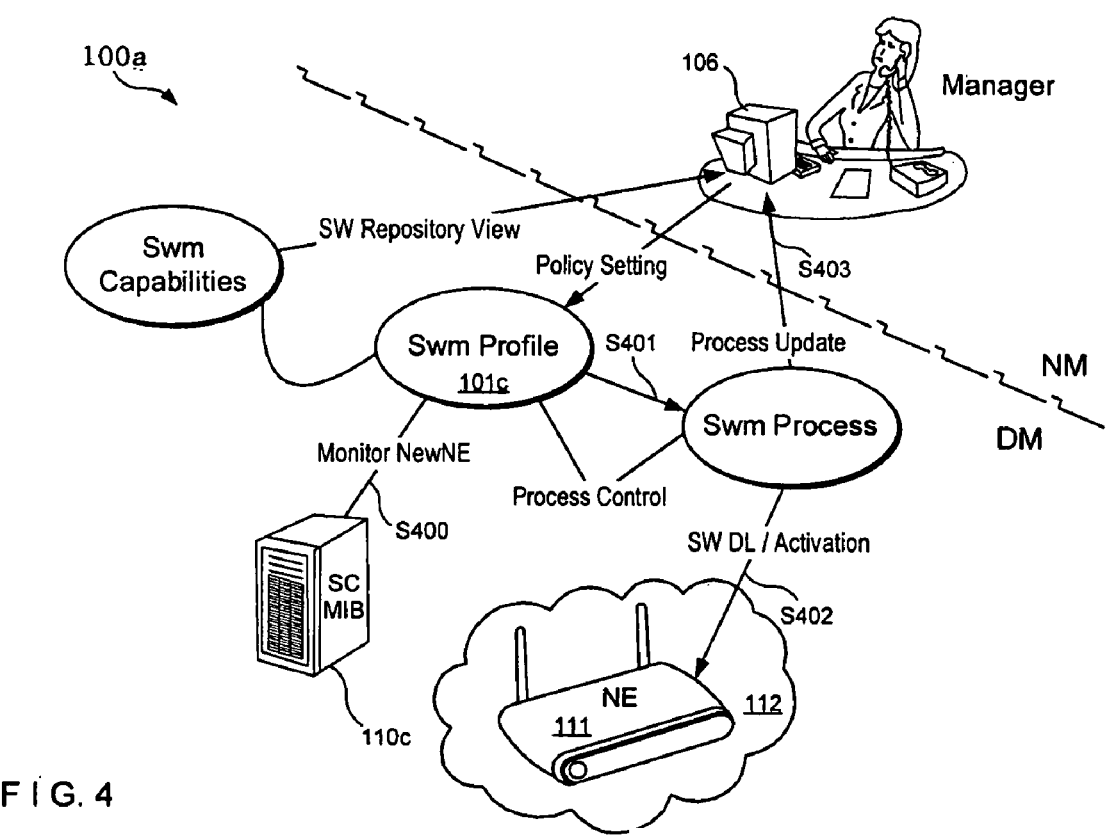
FIG. 4 is a combination block/flow diagram for providing a new network equipment (NE) in the network management system architecture for software management and method according to yet exemplary embodiment of the present invention.

Another exemplary use case may be the provisioning of a new NE 111 in a communication network 112 as depicted in FIG. 4. When a new NE 111 is installed in the existing network 112 in step S400 the profile device 101*c* is informed about the new NE 111. For example, the swm profile device 101*c* monitors the hw repository 110*c*, in particular the self-configuration process 110*c* and/or the MIB 110*c* for new NEs 111 requiring software management support. For example, a new NE 111 may require the installation of a software. The self-configuration process 110*c* may require software download, software installation and/or software activation. Thus, the self-configuration process 110*c* can interact with the appropriate Profile Object, which in turn creates the Process Object, and hence starts the physical "real-world" software download, software installation and/or activation process.

In step S401, based on predefined profile settings in the swm profile device 101*c*, the swm profile device 110*c*, in particular a swm profile object within the swm profile device 110*c*, may instantiate a corresponding physical swm process or swm process description. In step S402 the generated swm process instance and the generated physical swm process conduct the process steps as determined by the corresponding profile. For example the physical process performs downloading of the associated software to the corresponding NE 111, installing the associated software on the corresponding NE 111 and activating the associated software on the corresponding NE 111.

The exemplary results and/or the process status information or the attributes of the physical process are mapped to the process description, the process representation or to the corresponding process object. Thus, in step S403, the process object and/or the physical process inform the user terminal 106 about the results of the process execution.

As provided above, the grade of automation of an automated process can be determined by using the concept of stop points. Stop points may indicate during a running process that an operator requires or has the possibility of receiving feedback of the running process and the process suspends until the process receive a trigger from the operator to continue. This may allow an operator to automate standard procedures. However, complicated parts within a process may be carefully executed.

Figure 5:
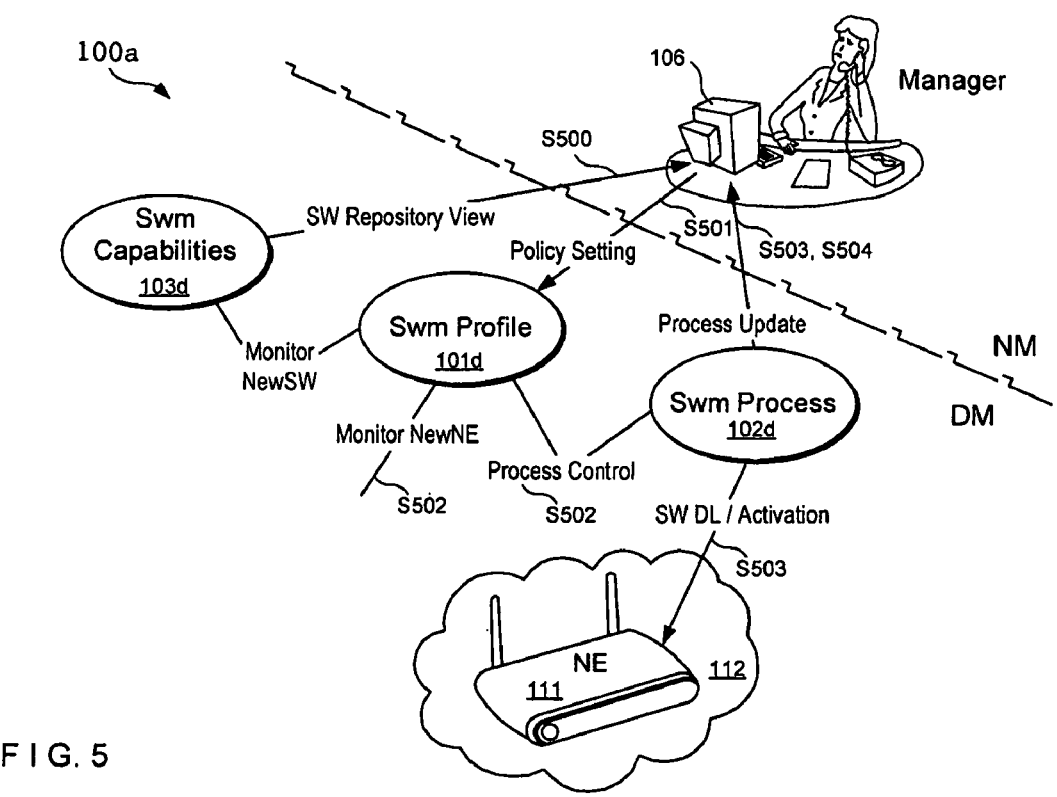
FIG. 5 is a combination block/flow diagram for setting stop points in a process for software management and a method according to a further exemplary embodiment of the present invention.

An exemplary embodiment of the method for setting such stop points for automated software management according to the present invention is shown in more detail in FIG. 5. A stop point is an example for a capability. Thus, exemplary stop points may provide an additional capability for automated swm by enabling interception points, facilitating an operator to perform additional tasks.

In step S500, a user terminal 106 or a manager may retrieve from the swm capability device 103*d* information on available software as well as on the stop point capability. Using this information, the manager can set profiles for automated software management via the user terminal 106 as shown in step S501. The profiles can be generic for NEs or the profiles can SW (software) based. Furthermore, the manager can identify the required stop points, e.g., at which steps or stages of process execution can be stopped. In step S502, the swm profile device 101*d* monitors the network 112 for new NEs 111 and the sw repository (not shown in FIG. 5) for new software. As described with respect to FIG. 3 and FIG. 4, after detecting new software or a new NE 111 in the network 112, the swm profile device may instantiate a swm process in the swm process device 102*d*.

In step S503, the generated process instance and the generated physical process conduct the process steps as determined by the corresponding profile. For example, the physical process performs downloading of the associated software to the corresponding NE 111, installing the associated software on the corresponding NE 111 and activating the associated software on the corresponding NE 111. However, since the exemplary stop points are set, during downloading, installing and activating the software, the corresponding process interacts with the user terminal 106 and/or with the manager according to the required stop points.

The results and status information of the physical process are mapped to the process description or to the corresponding process object, and thus in step S504 the process object and/or the physical process inform the user terminal about the results of the process execution.

Automated software management may reduce manual interaction when bringing many network elements into the network or during software update in up-and-running network elements, thereby saving OPEX. Nevertheless, the network operator may desire to control of the software configuration process. Thus, the concept of the exemplary stop points may facilitate an operator to define the grade or level of automation.

As described above in a software management process three objects may be used.

For example, the first object used during software management can be the Software Management Capabilities Object. This exemplary object represents the software management capabilities offered by the system 112. The capabilities may be e.g. specific for certain NE 111 types so that there exists a plurality of objects. Capabilities can include, for example, software versions and software packages available for a NE 111 type. Capabilities may also include the so-called exemplary stop points. At these points the execution of the software management process stops until a continuation request from the IRP Manager is received.

The second object used during software management may be the Software Management Profile Object. The Software Management Capabilities Objects can be profiled into Software Management Profile Objects. Profiling means that certain offered capabilities are selected and configured and others are not selected. Profiling can be achieved by setting policies for Software Management Capabilities Objects. Relating to the example of stop points, here the IRP Manager would actually select from the set of stop points available in a Software Management Capabilities Object the points where the corresponding process is really supposed to stop. For a NE 111 starting the software management process, a corresponding unambiguous allocation of a profile to the NE may be preferred or required.

The third object used during software management can be the Software Management Process Object. This object represents the real software management process, the running software management process or the physical software management process for a certain NE. The instance may be created when the process starts and is deleted when the process ends.

Depending on the software technology, e.g., XML or CORBA and the modeling framework used, the above specified objects can be real objects whose attributes are accessible via generic set-operations or get-operations. As an alternative or in addition, these object can be so-called "support objects" whose properties/attributes are accessible via dedicated operations acting upon the objects and notifications triggered by them. In addition, a combination thereof is possible.

The following description provides focus on interaction capabilities with operations/notifications.

For example, the attributes of an object may be accessed with standard read or write commands or with specific functions. The following Table 1 provides an overview about the support objects and related operations and notifications used in a swm process or software management process.

TABLE 1

| Support Objects | Operations | Notifications |
| --- | --- | --- |
| SwmCapabilities | listSwmCapabilities | notifyNewSwAvailability |
| SwmProfile | listSwmProfiles | notifySwmProfileCreation |
|  | createSwmProfile | notifySwmProfileChange |
|  | changeSwmProfile | notifySwmProfileDeletion |
|  | deleteSwmprofile |  |
| SwmProcess | listSwmProcess | notifySwmProcessCreation |
|  | continueSwmProcess | notifySwmProcessStatusChange |
|  | cancelSwmProcess | notifySwmProcessCancelled |

In the different possible Interaction Scenarios or Use Cases for software management as shown in FIGS. 2 to 5, message flows are described herein.

For example, such exemplary message may flow, e.g., the objects, operations and notifications in the different scenarios between the Manager/Operator and the exemplary Software Management apparatus 100 for the different use case scenarios are described in the following. The exemplary use cases can include policy setting, new software available, new NE 111 available and setting stop points.

For policy setting, the manager or user terminal 106 may set a policy for swm capabilities in the swm capability device 103a, thereby creating a swm profile.

The use case new software available can describe what occurs if new software is made available in the software repository.

The use case new NE 111 available may describe a scenario where a new NE 111 is added to the network 112. Either the self-configuration process 110c for the new NE 111 or the MIB 110c may interact with swm profile.

For setting the exemplary stop points, the manager may select some stop points out of the set of available stop points. As provided herein, further details on the proposed objects and notifications are provided. For example, the names of the objects, values, attributes, entries, operations and notifications are self-explaining. Thus, the explanation of the corresponding object can be derived from the corresponding name.

The supporting object class swManagementCapabilities is shown in FIG. 6. This exemplary object class facilitates the IRP Manager or user terminal 106 to determine on the Itf-N interface 107 the sequence in which the sw management steps are performed in NEs of a certain type. Furthermore, the IRP Manager 106 can determine how the NE 111 react in the case when a step or a procedure does not perform normally. Besides this, the IRP Manager 106 can determine before which steps a stop point can be set, such that the self-configuration step or the software management step or procedure halts and waits for a continuation request by the IRP Manager.

The supporting object class swManagementCapabilities comprises the attributes id, nEAndSWInformation and swStepList. The attribute id can be an identifier for identifying a NE.

The attribute nEAndSWInformation can be used to describe for which NE or NEs and for which SW version this swManagementCapabilities applies (examples: identifier+objectClass, identifierList+objectClass, object class, NEtype, vendor version etc.). nEAndSWInformation may also describe dependencies to the presence of other SW (software) packets.

For example, swStepList describes a list, wherein each entry in the list contains a set of nameOfPotentialStopPointSwStep, sequenceNumberInScProcess or sequenceNumberInSwProcess, behaviourInCaseOfErrorsOrDelays, stopPointProperty The list element nameOfPotentialStopPointSwStep can have one value of the list of values swDownload, swFallback, swInstallation and swActivation. This list of values may be exhaustive. Thus, if a certain step is not visible or not supported in the SW management process, then it shall not be shown or listed in the swStepList.

The exemplary list element behaviourInCaseOfErrorsOrDelays can have one of the values stepSkippedAndSwManagementContinued/SwManagementProcessStopped.

The exemplary list element sequenceNumberInScProcess provides the sequence number of the step in the corresponding sc process or in the corresponding swm process.

The exemplary list element stopPointProperty can have one of the values stopPointCan be SetBeforeThisStep/stopPointCanNotBeSet FIG. 7 shows an exemplary structure of the supporting object class SwManagementProfile, which object allows the IRP Manager to select from the stop points offered in nameOfPotentialStopPointSwStep of s2ManagementCapabilities or of swManagementCapabilities those which should be used to stop the SW management process for NEs 111 which fit to the nEAndSWInformation. For the NE 111 starting its self-configuration process there should be no ambiguity which profile is valid for the NE 111.

For example, SwManagementProfile comprises the attributes id, nEAndSWInformation, swActivatedStopPointList. The attribute nEAndSWInformation of the swManagementProfile object should not intersect with nEAndSWInformation of other swManagementProfile instances. The attribute swActivatedStopPointList may describe a list of steps before which steps an SW management process following this profile stops, values are the same values as for nameOfPotentialStopPointSwStep.

A check if this swActivatedStopPointList is valid should be perfromed. Therefore, all stop point steps selected in swActivatedStopPointList need the property stopPointCan be SetBeforeThisStep in a swManagementCapabilities instance where the nEAndSWInformation covers the nEAndSWInformation of the swManagementProfile.

By transmitting notifications to notify SwManagementProfileCreation, notifySwManagementProfileChange and notifySwManagementProfileDeletion, the NM systems 106 may be informed about what happens with instances of this object class in the profile device 102.

FIG. 8 shows an exemplary structure of supporting object class swManagementProcess. This object class describes the SW management process for a self-configuring NE 111. The swManagementProcess object class facilitates the IRP Manager to be informed about the current status of the process, e.g. which steps are completed etc.

The swManagementProcess can comprise the attributes id, nEIdentification, swStepList.

For example, the attribute nEIdentification uniquely identifies the NE 111 where the (physical) SW management process is running or for which NE a SW management process is running.

Each entry in the swStepList may contain a nameOfSwStep, stepStatus, stopPointSetStatus.

The entry nameOfSwStep may comprise the same values as nameOfPotentialStopPointSwStep.

The entry stepStatus may comprise the values notYetDone, running, completed, awaitingConfirmation, failure.

The entry stopPointSetStatus may comprise the values stopPointIsSetBeforeThisStep/stopPointIsNotSet When the SW management process in an NE 111 starts an instance of the swManagementProcess is created automatically. The instance of swManagementProcess may be the process object describing a process.

When the last step of the self configuration process or of the software management process is completed successfully, the swManagementProcess instance can be deleted automatically.

By transmitting notifications to notify SwManagementProcessCreation, notifySwManagementProcessChange and notifySwManagementProcessDeletion, NM systems 106 may be informed about what happens with instances of this object class, e.g., the status of the instances can be reported.

FIG. 9 shows an exemplary operation listSwmCapabilities. This exemplary operation facilitates the IRP Manager to determine on the Itf-N interface 107 which steps and/or procedures in the SW management are performed in NEs of a certain type, what is done by the NE in case a step does not perform normally and before which steps/procedures a stop point can be set, such that the software download halts and waits for a continuation request by the IRP Manager.

The operation listSwmCapabilities can comprise the input parameter nEAndSWInformationand describes for which NE 111 or NEs 111 the capabilities are to be listed. For example, the input parameter can be identifier+objectClass, identifierList+objectClass, object class, NEtype, vendor version etc. If this parameter is not present, e.g., all SwmCapabilities instances are to be listed in the output. The operation listSwmCapabilities can comprise the output parameters SwmCapabilitiesListand and result.

Each entry in the exemplary list contains SwmCapabilitiesList comprises a set of Id of SwmCapabilities, nEInformation of SwmCapabilities and swmStepList of SwmCapabilities. The output parameter result having an value of success and empty SwmCapabilitiesList, e.g., meaning that no instance of capabilities or no capability object was found.

FIG. 10 shows an exemplary operation listSwmProfiles. This exemplary operation facilitates the IRP Manager to determine which instances of SwmProfile are valid NEs of a certain type.

The operation listSwmProfiles comprises the input parameter nEAndSWInformation. The input parameter nEAndSWInformation can be used to describe for which NE 111 or NEs the profiles are to be listed. The corresponding NEs 111 are for example identified by identifier+objectClass, identifierList+objectClass, object class, NEtype, vendor version etc. If this parameter is not present, all SwmProfiles instances are to be listed in the output.

The operation listSwmProfiles comprises the Output parameters SwmProfileList and result. Each entry in the list SwmProfileList may contain a set of Id of SwmProfile, nEInformation of SwmProfile and swmActivatedStopPointList of SwmProfile. If the output parameter result equals to success and SwmProfile is empty than no instance has been found.

FIG. 11 shows an exemplary operation createSwmProfiles. This exemplary operation allows the IRP Manager to establish an instance of SwmProfile to be valid for NEs of a certain type. The exemplary input and out put parameters of the operation createSwmProfiles are described in FIG. 11.

FIG. 12 shows the exemplary operation changeSwmProfiles. This exemplary operation facilitates the IRP Manager to change an instance of SwmProfile. The input and output parameters of the operation changeSwmProfiles are shown in FIG. 12.

FIG. 13 shows an exemplary operation deleteSwmProfiles. This exemplary operation allows the IRP Manager to delete an instance of swManagementProfile. The input and output parameters of the operation deleteSwmProfiles are shown in FIG. 13.

FIG. 14 shows an exemplary operation listSwmProcesses. This exemplary operation allows the IRP Manager to find out which NEs 111 are currently running a SW management process and its status. The input and output parameters of the operation listSwmProcesses are shown in FIG. 14.

FIG. 15 shows an exemplary operation continueSwmProcess, which can be mandatory (M). This exemplary operation allows the IRP Manager to contain a SW management process which currently has stopped at a stop point step. The input and output parameters of the operation continueSwmProcess are shown in FIG. 15.

FIG. 16 shows an exemplary operation cancelSwmProcess. This exemplary operation allows the IRP Manager to cancel a SW management process which is currently ongoing. The input and output parameters of the operation cancelSwmProcess are shown in FIG. 16.

FIG. 17 shows an exemplary notification notifyNewSwAvailability. This exemplary notification conveys information about the availability of new SW. The input and output parameter of the notification notifyNewSwAvailability are shown in FIG. 17.

FIG. 18 shows an exemplary notification notifySwmProfileCreation. This exemplary notification conveys information about the creation of an instance of an Information Object Class (IOC) or Object Class swManagementProfile. The input and output parameter of the notification notifySwmProfileCreation are shown in FIG. 18.

FIG. 19 shows an exemplary notification notifySwmProfileChange. This exemplary notification conveys information about a change of an instance of IOC swManagementProfile. The input and output parameter of the notification notifySwmProfileCreation are shown in FIG. 19.

FIG. 20 shows an exemplary notification notifySwmProfileDeletion. This exemplary notification conveys information about the deletion of an instance of IOC swManagementProfile. The input and output parameter of the notification notifySwmProfileDeletion are shown in FIG. 20.

FIG. 21 shows an exemplary notification notifySwmProcessCreation. This exemplary notification conveys information about the creation of an instance of IOC swmProcess. The input and output parameter of the notification notifySwmProcessCreation are shown in FIG. 21.

FIG. 22 shows an exemplary notification—notify SwmProcessStatusChange. This exemplary notification conveys information about the change of an instance of IOC swmProcess. The input and output parameter of the notification notifySwmProcessStatusChange are shown in FIG. 22.

FIG. 23 shows an exemplary notification notifySwmProcessCancelled. This exemplary notification conveys information about the deletion of an instance of IOC swmProcess. The input and output parameter of the notification notifySwmProcessCancelled are shown in FIG. 23.

FIG. 24 shows a combined block and flow diagram of another process which may be modeled or implemented using the self configuration (sc) management apparatus 100e. The exemplary management apparatus 100e can comprises the sc capability device 103e, the sc profile device 101e and the sc process device 102e. The sc capability device 103e can comprise the sc capabilities of the network 112 and/or of every NE 111, the sc profile device 101e comprises profiles generated for the self configuration (sc) and the sc process device 102e comprises the generated self configuration processes.

Three support objects which can be used for providing the sc functionality may be ScManagementCapabilities, ScManagementProfile, and ScProcess.

The ScManagementCapabilities object can provide an IRP Manager a view into the Self-configuration capabilities on an NE-type basis.

The ScManagementProfile object facilitate the IRP Manager to set policies for automatic Self-configuration The ScProcess object can be the instance of an actually ongoing Self-configuration activity on a specific NE 111, facilitating IRP Managers to monitor the status as well as to interact via pre-defined stop-points.

The table 2 provides an overview about the exemplary support objects and related operations and notifications for this IRP.

TABLE 2

| Support Objects | Operations | Notifications |
|---|---|---|
| SwmCapabilities | listSwmCapabilities | notifyNewSwAvailability |
| SwmProfile | listSwmProfiles | notifySwmProfileCreation |
|  | createSwmProfile | notifySwmProfileChange |
|  | changeSwmProfile | notifySwmProfileDeletion |
|  | deleteSwmprofile |  |
| SwmProcess | listSwmProcess | notifySwmProcessCreation |
|  | continueSwmProcess | notifySwmProcessStatusChange |
|  | cancelSwmProcess | notifySwmProcessCancelled |

Further, FIG. 24 also shows the provisioning of a new NE 111 in a communication network 112, whereas the NE 11 and the sc management apparatus 100e, respectively, can be configured to conduct an sc process. When a new NE 111 is installed in the existing network 112 in step S2400, the profile device 101e is informed about the new NE 111. For example, the sc profile device 101e may monitor the hw repository 110e and/or the MIB 110e for new NEs 111 requiring self configuration support.

In step S2401, based on predefined profile settings in the sc profile device 101e, the sc profile device 101e, in particular a sc profile object within the sc profile device 101e, can instantiate a corresponding physical sc process and/or a sc process description or a sc process representation. For example, such sc process may be executed by the sc process device 102e.

In step S2402 the generated sc process instance and the generated physical sc process may conduct the process steps/procedures as determined by the corresponding profile. For example the physical process performs downloading of the associated software to the corresponding NE 111, installing the associated software on the corresponding NE 111 and activating the associated software on the corresponding NE 111.

The generated sc process may invoke a swm process for installing the software. Thus, the software management profile device 101c may also monitor the sc process. After installing the software, the swm process can return to the sc process and the sc process continues.

The exemplary results and the process status information or the attributes of the physical process can be mapped to the process description or to the corresponding process object, and thus in step S2403, the process object and/or the physical process can inform the user terminal about the results of the process execution.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Exemplary Acronyms and Terminology:

| | |
|---|---|
| DM: | Domain manager |
| IOC: | Information Object Class |
| NE: | Network Element |
| NM: | Network Management |
| OAM: | Operation, Administration, Maintenance |
| OPEX: | Operational Expenses |
| SW: | Software |
| SWM/Swm: | Software Management |
| SC: | Self-Configuration |
| MIB: | Management Information Base |
| CORBA: | Common Object Request Broker |
| XML: | Extensible Markup Language |

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. In addition, to the extent that the prior art knowledge has not been explicitly incorporated by reference herein above, it is explicitly being incorporated herein in its entirety. All publications referenced herein above are incorporated herein by reference in their entireties.

What is claimed is:

1. A management apparatus for managing a network equipment element comprising:
 a profile device including a memory adapted to receive a capabilities software object including a number of attributes, the capabilities software object offering capabilities of a corresponding physical process including a set of stop points, ones of the stop points associated with stop point properties, offered stop points determining points at which the corresponding physical process can be stopped and resumed, and adapted to receive a generation request for an instance of a profile software object and to profile the capabilities software object into at least one profile software object by selecting certain offered capabilities from the set of offered capabilities to provide a stop point list, the stop point list being checked to be valid if at least one selected stop point has a relevant stop list property in the capabilities software object, the at least one selected stop points determining at least one point at which the corresponding physical process is to stop, the profile software object having an attribute defining a network element type and a software version to which the profile software object is to apply which is applied to that profile software object instance and not to other profile software object instances; and a process device including a processor adapted to generate a process description of a physical process by using the at least one profile software object, where the process description generated is executable to control the physical process in accordance with the process description generated including at least one interruption of the physical process according to the at least one selected stop point.

2. The management apparatus according to claim 1, further comprising: a capability arrangement configured to comprise at least one capability,
wherein the profile arrangement is connected to the capability arrangement;
wherein the profile arrangement is further configured to select one of the at least one capability for generating the at least one process profile.

3. The management apparatus according to claim 2, wherein the at least one process profile is generated by profiling the at least one capability.

4. The management apparatus according to claim 2, wherein the at least one capability is at least one of a stop point capability, a specific network element capability, a software version capability, a software package available capability and a system-offered capability.

5. The management apparatus according to claim 4, wherein the stop point capability is configured to control an interruption of at least one of the executed process description or the physical process.

6. The management apparatus according to claim 2, wherein the capability arrangement is connected to a software repository.

7. The management apparatus according to claim 2, wherein at least one of the profile arrangement, the process arrangement or the capability arrangement is executed on a processor.

8. The management apparatus according to claim 2,
wherein at least one of the profile arrangement, the process arrangement or the capability arrangement comprises a management interface, and
wherein the management interface is configured to communicate with a management instance.

9. The management apparatus according to claim 2, wherein at least one of the profile arrangement, the process arrangement or the capability are facilitated on a Domain Manager layer.

10. The management apparatus according to claim 1, wherein the process arrangement is connected to a network element via a particular connection, and wherein the physical process is configured to influence the network element via the particular connection.

11. The management apparatus according to claim 1, wherein the profile arrangement is connected to a network repository.

12. The management apparatus according to claim 11, wherein the physical process is at least one of a self-configuring process, a self provisioning process, a self-optimizing process, a self-healing process or a software-management process.

13. The management apparatus according to claim 1, wherein the management apparatus is a distributed system.

14. A method for managing a network equipment element, comprising:
providing a capabilities software object including a number of attributes, the capabilities software object offering capabilities of a corresponding physical process including a set of stop points, ones of the stop points associated with stop point properties, offered stop points determining points at which the corresponding physical process can be stopped and resumed;
receiving a generation request for an instance of a profile software object and
profiling the capabilities software object into the profile software object by selecting certain offered capabilities from the set of offered capabilities to provide a stop point list, the stop point list being checked to be valid if at least one selected stop point has a relevant stop list property in the capabilities software object, at least one selected stop points determining at least one points at which the corresponding physical process is to stop the profile software object having an attribute defining a network element type and a software version to which the profile object is to apply which is applied to that profile software object instance and not to other profile software object instances;
generating a process description of a physical process by using the profile software object;
executing the process description with respect to the network equipment element; and
controlling the physical process in accordance with the process description, including at least one interruption of the physical process according to the selected stop points.

15. The method according to claim 14, further comprising:
selecting at least one capability included in a capability device; and
generating the at least one process profile by using the at least one selected capability.

16. Computer instructions for managing a network equipment element, embodied on a non-transitory computer accessible medium, that when executed causes a processor to perform a method comprising:
providing a capabilities software object including a number of attributes, the capabilities software object offering capabilities of a corresponding physical process including a set of stop points, ones of the stop points associated with stop points properties, offered stop points determining points at which the corresponding physical process can be stopped and resumed;
receiving a generation request for an instance of a profile software object and profiling the capabilities software object into the profile software object by selecting certain offered capabilities from the set of offered capabilities to provide a stop point list, the stop point list being checked to be valid if at least one selected stop point has a relevant stop list property in the capabilities software object, at least one selected stop points determining at least one points at which the corresponding physical process is to stop, the profile software object having an attribute defining a network element type and a software version to which the profile object is to apply which is applied to that profile software object instance and not to other profile software object instances;
generating a process description of a physical process by using the profile software object;
executing the process description with respect to the network equipment element; and
controlling the physical process in accordance with the process description, including at least one interruption of the physical process according to the at least one selected stop points.

17. A method for managing a network equipment element, comprising:

providing a capabilities software object including a number of attributes, the capabilities software object offering capabilities of a corresponding physical process including a set of stop points, offered stop points determining points at which a corresponding physical process can be stopped and resumed;

receiving a generation request for an instance of a profile software object and profiling the capabilities software object into the profile software object by selecting certain offered capabilities from the set of offered capabilities and including at least one selected stop point determining at least one point at which the corresponding physical process is to stop, the profile software object having an attribute defining a network element type and a software version to which the profile object is to apply which is applied to that profile software object instance and not to other profile software object instances;

generating a process description of a physical process by using the profile software object;

executing the process description with respect to the network equipment element; and controlling the physical process in accordance with the process description, including at least one interruption of the physical process according to the at least one selected stop point.

* * * * *